United States Patent [19]

van den Broek

[11] 4,040,190

[45] Aug. 9, 1977

[54] METHOD AND APPARATUS FOR DRYING MANURE OR MUD OR THE LIKE

[75] Inventor: Adriaan van den Broek, Zeist, Netherlands

[73] Assignee: W. van den Broek's Machinefabriek B.V., Driebergen, Netherlands

[21] Appl. No.: 652,416

[22] Filed: Jan. 26, 1976

[30] Foreign Application Priority Data

Nov. 11, 1975 Netherlands .......................... 7513187

[51] Int. Cl.$^2$ .............................................. F26B 7/00
[52] U.S. Cl. .......................................... 34/11; 34/12; 34/60
[58] Field of Search ........................ 34/11, 12, 60, 61; 241/23, 234

[56] References Cited

U.S. PATENT DOCUMENTS

| | | | |
|---|---|---|---|
| 2,195,756 | 4/1940 | Taylor | 34/11 X |
| 2,213,668 | 9/1940 | Dundas et al. | 34/11 |
| 2,350,162 | 5/1944 | Gordon | 34/11 X |
| 2,879,950 | 3/1959 | Pollitz | 241/234 X |
| 3,963,471 | 6/1976 | Hampton | 34/11 |

*Primary Examiner*—John J. Camby

[57] ABSTRACT

Method and apparatus for drying mud or manure, which product, after passage through a mechanical dewatering device, is conducted through a thermal drying apparatus, whereby part of the product passed through the thermal drying apparatus is recycled by return and mixing with product passed through the dewatering device, prior to being introduced into the thermal drying apparatus, for obtaining a granular end product having grains of a desired size.

5 Claims, 3 Drawing Figures

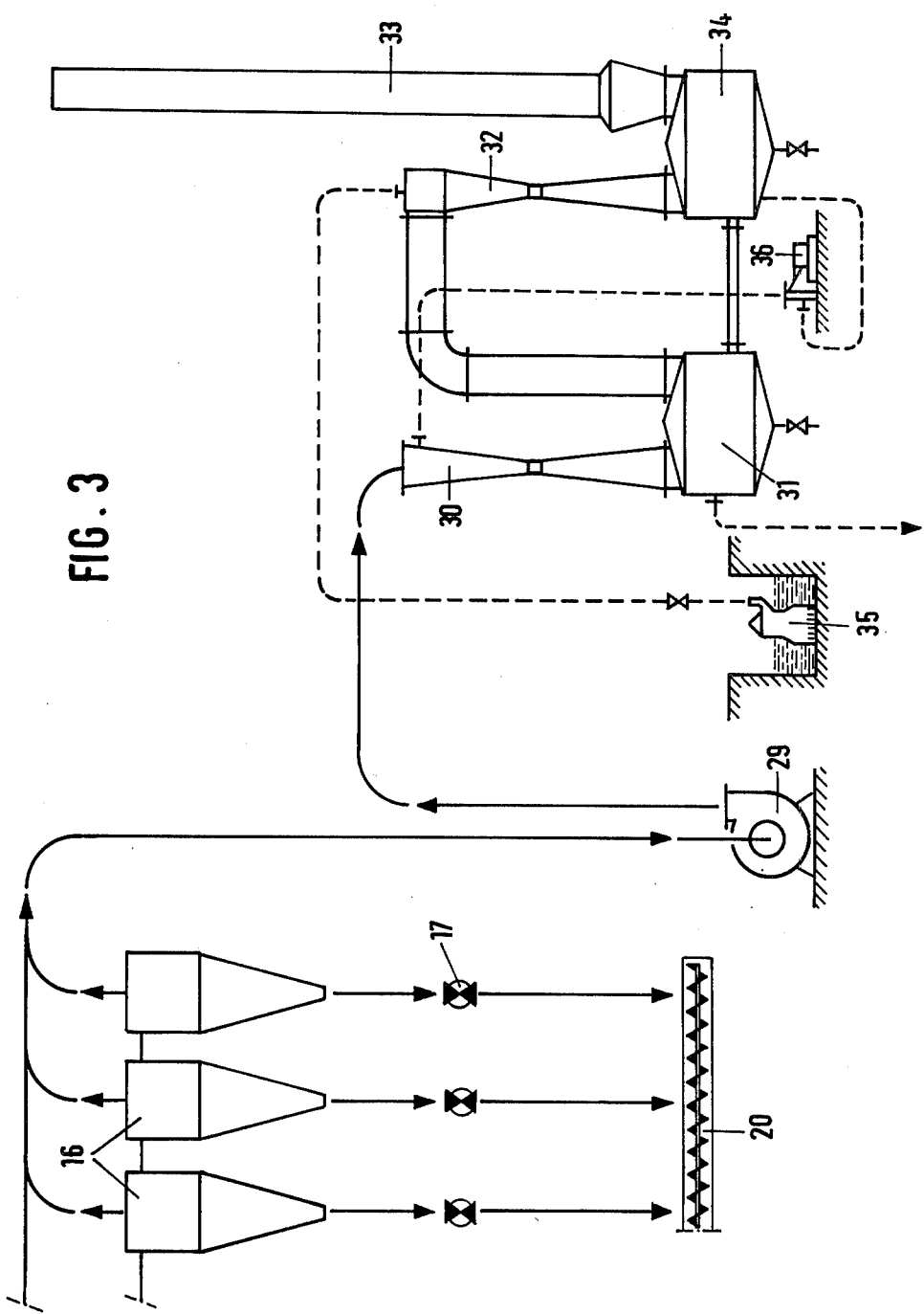

METHOD AND APPARATUS FOR DRYING MANURE OR MUD OR THE LIKE

The present invention relates to a method for drying a product such as manure or mud, e.g. sewerage mud, during which the product to be dried is conducted, after passage through a preparation apparatus, such as a transport or a mechanical dewatering device, through at least one thermal drying apparatus.

The passage of e.g. mud through the above apparatuses is generally employed for drying purposes. The drying of such products, in particular of mud, also according to the circumstances thereof, often produces difficulties that necessitate a proper control of the drying process, which also applies in connection with the properties required for the dried end product.

It is an object of the invention to provide a method enabling to so control the drying process that a granular end product is obtained having a specific granular size, in particular an optional granular size.

In the method according to the invention for the said purpose, part of the product passed through the thermal drying apparatus is recycled by return and mixing with product passed through the preparation device, such as transport or mechanical dewatering device, before it is introduced in the thermal drying apparatus. Preferably the recycled product is conducted through a grain crusher before it is mixed with the product passed through the preparation device. A further preference is that the recycled product is returned from a position situated beyond a cyclone separator positioned behind the drying device. The grains of the recycled product, after the mixing with the product originating from the preparation or mechanical dewatering device, increase in volume during their renewed passage through the part of the processing or treatment zone positioned downstream the mixing location. The eventual size of the grains in the end product may be controlled according to the invention by means of regulation of the crushing effect of the grain crusher as regards the size of the grains supplied by said device, or in combination with or exclusively by means of regulation of the ratio between the quantity per unit of time of recycled product and the end product discharged in said unit of time. These control possibilities render the drying process properly controllable as regards the obtention of an end product having the desired special properties, which are related to the subsequent application of the end product.

It is an object of the invention to also provide an installation for the performance of the method. This installation, which is provided in a known manner with a preparation device disposed in a treatment zone, such as a transport or a mechanical dewatering device and a thermal drying device positioned downstream thereof, as well as transport means for the other product transport across the treatment zone, is provided according to the invention with a return transport chain communicating with a location in the treatment zone beyond the thermal drying device and contiguous with a mixing device positioned between the preparation device and the thermal drying device in the treatment zone. Preferably there is positioned a grain crusher in the return transport chain in a place situated upstream of the said mixing device. Said crushing device may be adjustable for controlling the size of grains to be supplied by said device. The installation may be provided in a known manner with a cyclone separator in the processing zone downstream the thermal drying device, the return transport chain according to the invention being contiguous with a location in the processing zone beyond the cyclone separator.

A favourable embodiment is obtained when the return transport chain also functions as discharge transport chain from the end of the processing zone and to this effect is branched in its return zone to a bunker or the like for dry end product.

Furthermore means may be disposed for controlling the transport ratio between the quantities of product in recirculation and those being in final discharge from the installation.

One embodiment of an installation according to the invention will now be explained by way of example with reference to the accompanying drawings.

FIG. 3 shows a final stage that includes separating gases from dried mud.

Figure 1:
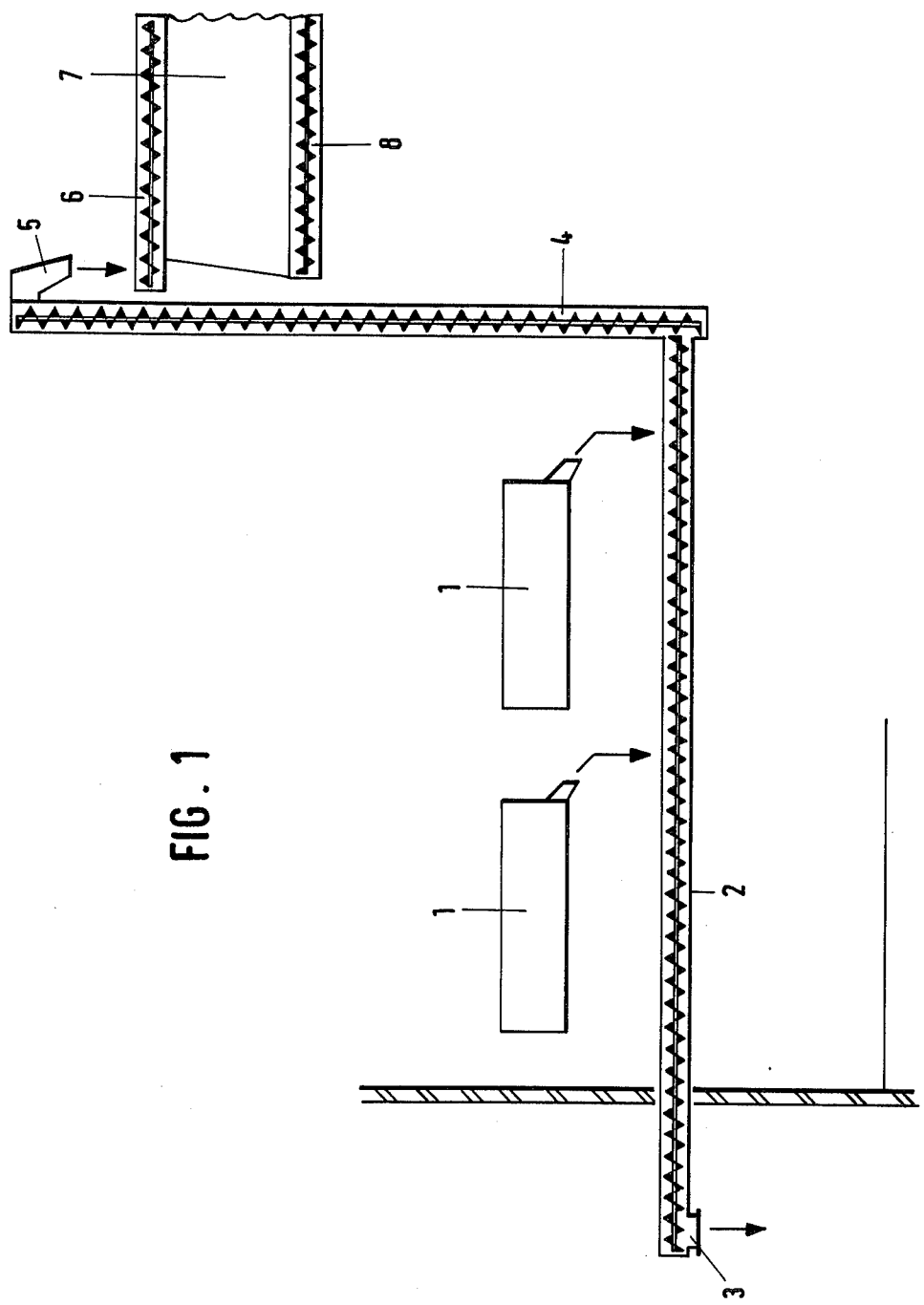
FIG. 1 shows the initial stage of the processing.
Figure 2:
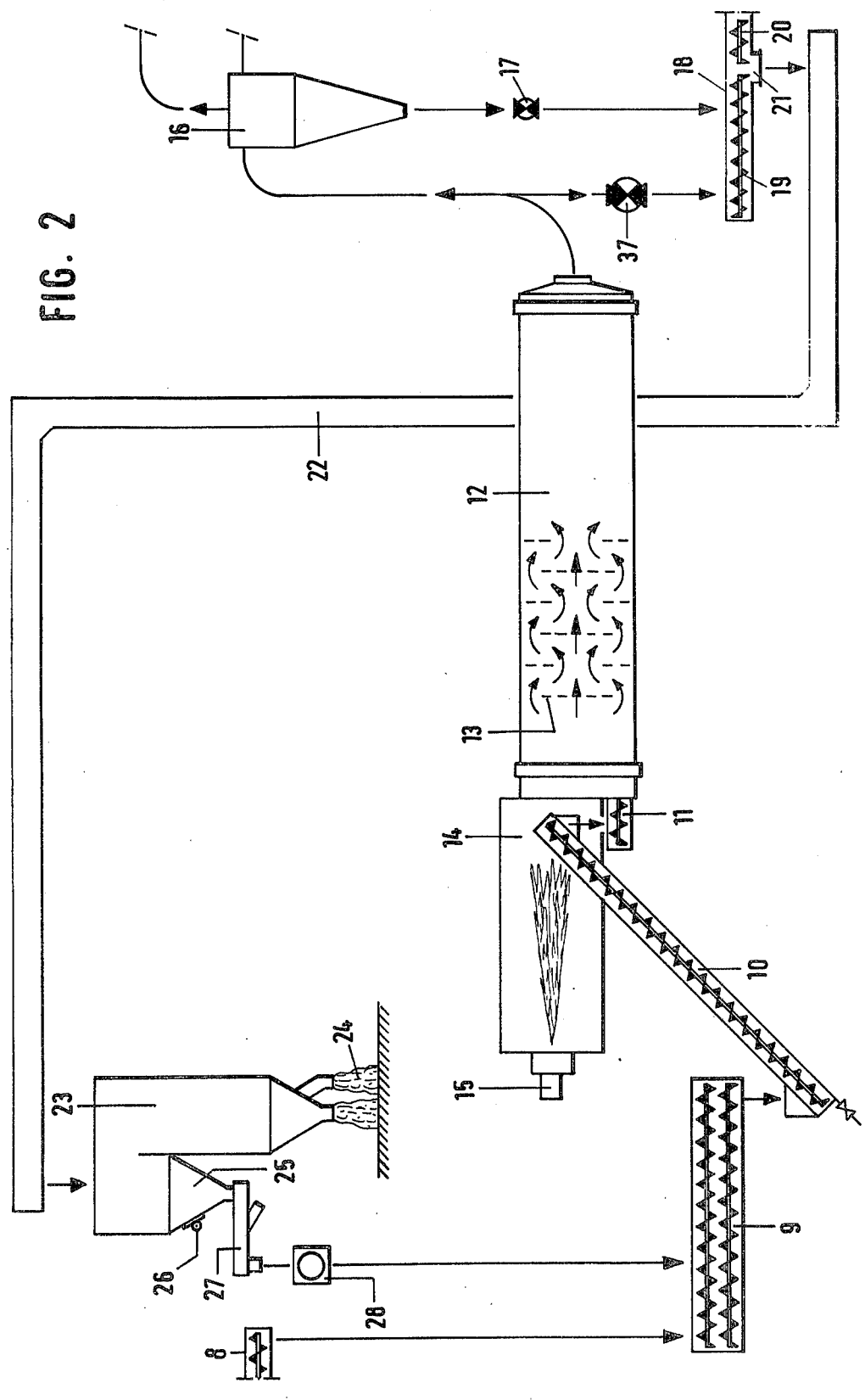
FIG. 2 shows a later stage moving mud in a rotary drum.

FIG. 1 shows by 1 two screen belt presses to which the mud is supplied in the initial stage of the processing zone and wherein a first dewatering takes place. The screw conveyor 2, from the housing of which screened water may flow away at 3, conducts the mud which then may contain 20 to 30% of dry matter, to the upwardly conducting screw conveyor 4, which conducts the mud via the mouth 5 and the distributor screw 6 into the hopper 7 for wet mud. The dosing screw 8 conducts the mud from hopper 7, see furthermore FIG. 2, to the mixing device 9 working with the conveyor screws, from which position the mud is successively conducted by means of the inclined conveyor screw 10 to the introduction screw 11, which propells the mud in the rotary drying drum 12 wherein the mud is forced, by means of partitions 13, to follow a zig-zag path. Through the drying drum are blown from a furnace 14 a stream of hot gases originating from burner 15. The gases with the hot dried mud product pass from the drying drum 12 in a cyclone battery 16, see also FIG. 3, wherein the gases are separated from the dried mud which attains from each cyclone via a dust sluice 17 the collector screw conveyor 18, which conducts, through two screws 19 and 20 working in opposite directions, the dried product to the discharge opening 21.

From the opening 21 the dried mud falls on the return-cum-discharge conveyor 22 which may have the form of a bucket elevator, which conveyor conducts the dried mud in the bunker 23 for dried mud, from which said mud is put in bags 24 for supply purposes.

Part of the dried mud transported by the bucket conveyor however arrives in the funnel-shaped container 25 whereon is mounted a vibrating motor 26 which, in proportion to the setting of its vibration and/or frequency amplitude deposits part of the dried mud on the vibrating conveyor 27 which brings said mud portion in the grain crusher 28. Instead of vibrating motor 26, use may also be made of a dosing screw with driving variator. The grain crusher 28 may e.g. have coacting rollers of which the interspace is adjustable so that it supplies said mud portion with a selective granular size in the mixer 9 wherein said part of dried mud is mixed with the mud supplied from bunker 7 for wet mud in order to be conducted together therewith through the drying drum 12 and the cyclone battery 16.

The gases originating from the cyclone battery 16 are discharged via the fan 29, a first venturi washer 30, a drip cather 31, a second venturi washer 31 and a chimney 33 with drip cather 34. By 35 is indicated a washwater pump, by 36 a circulating pump for the washwater. By 37 is shown yet in FIG. 2 a trip sluice between the drying drum 12 and the cyclone battery 16.

I claim:

1. A process for drying a product, such as manure or mud and particularly sewerage mud, including the steps of passing said product to be dried through a preparation device to produce a prepared product suitable for introduction into a thermal drying device, thereafter passing said prepared product through a thermal drying device to produce a granular dried end product, and recycling at least a portion of said granular dried end product by returning and mixing said portion of said granular dried end product with said product being processed at a position in said process in advance of said thermal drying device, wherein the improvement in said drying process is comprised of the step of:

controlling the grain size of said granular dried end product by varying the grain size of the recycled portion of said granular dried end product through mechanical crushing of said recycled portion to a selected known grain size, and prior to drying, mixing the crushed recycled portion with said prepared product in a predetermined known amount.

2. A process as defined in claim 1 and the step of:

regulating the grain size of said granular dried end product by regulating the ratio between said portion of said granular dried end product being recycled per unit of time and the quantity of said granular dried end product being produced per unit of time.

3. An apparatus for drying a product, such as manure or mud and particularly sewerage mud, including a product preparation device, such as a mechanical dewatering device, a thermal drying device connected to said preparation device, product transport means positioned for transport of product from said preparation device to said drying device, product return transport means positioned for receipt of a portion of the dried end product from said drying device and formed for transport of said dried end product to a location in advance of said drying device and for discharge into a mixing device, and a mixing device formed for receipt of dried end product from said return transport means and further formed to mix said dried end product with product being processed at a position in advance of said drying device, wherein the improvement in said drying apparatus comprises:

mechanical crushing means connected to said product return transport means for receipt of dried end product therefrom and formed to mechanically crush said dried end product to a predetermined grain size, said mechanical crushing means being further connected for transport of crushed dried end product to said mixing device.

4. Apparatus as defined in claim 3 and, a cyclone separator connected to said drying device for transport of dried end product thereto and formed for separation and discharge of the dried end product therefrom, and wherein said return transport means is positioned for receipt of said dried end product after discharge from said cyclone separator.

5. Apparatus as defined in claim 3 wherein, said mechanical crushing means is provided by a grain crushing device formed for adjustable control of the grain size of the crushed dried end product produced thereby, said product return transport means is formed for receipt of substantially all of said dried end product from said drying device, and bunker means connected for receipt of dried end product from said product return transport means, said product return transport means being further formed for deposit of a portion of said dried end product in said mixing device and a remainder of said dried end product in said bunker means.

* * * * *